United States Patent [19]

El-Kaddah

[11] Patent Number: 4,909,836

[45] Date of Patent: Mar. 20, 1990

[54] APPARATUS AND A METHOD FOR IMPROVED FILTRATION OF INCLUSIONS FROM MOLTEN METAL

[75] Inventor: Nagy H. El-Kaddah, Tuscaloosa, Ala.

[73] Assignee: The University of Alabama, Tuscaloosa, Ala.

[21] Appl. No.: 259,260

[22] Filed: Oct. 18, 1988

[51] Int. Cl.$^4$ ............ C21B 7/00; C22B 9/02; C22B 21/06
[52] U.S. Cl. .................. 75/10.67; 75/61; 75/62; 75/68 R; 75/93 R; 266/227; 266/230
[58] Field of Search ............ 75/93 R, 45, 46, 68 R, 75/10.67, 61, 62; 266/227, 229, 230; 210/748, 222

[56] References Cited

U.S. PATENT DOCUMENTS 4,067,731 1/1977 Chia ........................... 75/68 R
4,790,873 12/1988 Gesing et al. ............... 75/93 R Primary Examiner—Melvyn J. Andrews
Attorney, Agent, or Firm—Oblon, Spivak, McClelland, Maier & Neustadt

[57] ABSTRACT

A system which provides an improved design capable of removing liquid phase inclusions by combining a filter and an electromagnetic separation device through the addition of baffles to a chamber where molten metal is flowing under the influence of an applied electromagnetic field. The placement and the shape of the baffles reduces vorticity effects of the magnetic field in each of the baffled compartments and eliminates the convective flow resulting from the electromagnetic force in order to trap inclusions against the walls of the baffles.

17 Claims, 3 Drawing Sheets

APPARATUS AND A METHOD FOR IMPROVED FILTRATION OF INCLUSIONS FROM MOLTEN METAL

BACKGROUND OF THE INVENTION

1. Field of the Invention

The present invention is addressed to the production of metal and more particularly to the production of pure metal and metallic alloys being essentially free from slag or inclusions.

2. Discussion of Background

Non-metallic particles which are, for example, slag and which are known throughout the industry as "inclusions" within metal result from oxidation of active metallic elements during the molten metal refining and transport process and from the mechanical abrasion of refractories which are used to contain the molten metal. These inclusions may also be produced by being carried out from the starting change materials' such as ore or scrap or master alloys of ore or scrap which is used to make the metal or the alloy.

The removal of these inclusions or particles is essential to appearance and many times affects the mechanical properties of products made from the metal or the alloy. The recent significant increase in the demand for inclusion free metal has led to an increase in the effort to remove an ever decreasing size of inclusion from the metal.

The most common prior art techniques involved tundish and ladle refining by means of slag formation and subsequent removal as well as filtration of the particles from the molten metal system during transport to the mold. The ladle and tundish removal systems were commonly used for steel while filters were used for most other materials and the foundary industry.

The conventional filter systems involved removal by the action of refractory filters which were used to trap the inclusions. These filters worked on a combination of mechanical entrapment of the large particles and surface attraction of small inclusions which resulted from surface chemistry reactions. In any of these filter operations, as the filters were being used, their surfaces would begin to build up with the filter cake and eventually clogging occurred. As more and more clogging occurred, the flow rates of the molten metal through the filter progressively decreased until it was necessary to remove the filters and replace them with clean filters.

One of the other additional factors in the prior art filtering system is that these filters have difficulty removing very small particles (less than 40 microns) from the metal. This is true because the large particles or inclusions (greater than 50 microns) would clog the filter and thus make it ineffective in the removal of the smaller inclusions.

With this in mind, recent efforts have been addressed to a method of removing the large inclusions upstream of the filter in the molten flow. One of the significant areas which has evolved, in the pursuit of the large inclusion removal prior to the filter, is the use of electromagnetic fields. The first use or rather the concept of using the electromagnetic fields for the purification of molten metals was originated by Verte, Author's Certificate No. 141592-13c, Byull Isobert 19 (1961). The basic principle behind this process of Verte is similar to that of electromagnetic benefication of minerals as disclosed for example by U. Andres, *Magonetohydrodynamic and Magonetohydrostatic Methods of Mineral Separation*, John Wiley and Sons, 1976. The system of Verte, like the systems for Electromagnetic Separation of Minerals, produces a pressure gradient in the melt from an irrotational electromagnetic force field in order to accelerate the flotation of the inclusion particles.

Another procedure is shown in the system of R. Moreau, et al. Brevet Francais No. 79.08503, (1979). This system involves the developing of a separation process in which the electromagnetic force field in the system is generated by crossing the electric field produced by a passage of a D.C. current between two immersed electrodes in the melt with a uniform magnetic field. Although the feasibility of the process has been proven in the laboratory as detailed in the Proceedings of the Symposium on "Metallurgical Applications of Magnetohydrodynamics," by Marty and Alemany, The Metals Society, (1982), page 245, there still remains many technological problems when the process is scaled up to a system which would be necessary for commercial use. Most of these problems have to do with the electric field which must be produced in the melt and the effect on the melt.

One of the more recent developments in this area has been produced at Oak Ridge National Laboratory where there has been developed an electromagnetic separation process in which the electromagnetic forces in the melt are generated by induction from a time varying magnetic field. Although such technique eliminates the problem of melt contamination from the electrodes and although such technique is easy to implement, there remains significant problems because there is a lack of knowledge concerning the coupling between the electric and the magnetic field and the homogeniety of the electromagnetic force field. This force field is very important to the separation process because the vorticity of a force field would have a significant detrimental effect on the separation efficiency of the system. This is true because the force field vorticity will stir the melt and cause entrapment of the inclusion particles within the flow eddies. Thus, although Oak Ridge (ORNL) has produced a device which is capable of removing large particles (greater than 250 microns according to their results), significant problems still exist. The results of the ORNL device have been reported in an article by N. ElKaddah entitled "A Comprehensive Mathematical Model of Electromagnetic Separation of Inclusions in Molten Metals", I.E.E.E. Industry Application Society Annual Meeting, Pittsburgh, Oct. 2–7, Conference Records p. 1161, 1988. One of the immediately obvious problems with this system is that it removes inclusions only greater than 250 microns and furthermore, a significant shortcoming exists in that the vorticity of the electromagnetic force field established vigorously stirs the melt, which causes entrapment of inclusion particles within the flow eddies, as discussed above and carries them into the flowing stream, instead of separating them from the stream.

These large particles which become entrapped in the flow eddies created by the electromagnetic force have plagued all improvements in this area as well as in the area of separation of minerals when electromagnetic fields are used.

SUMMARY OF THE INVENTION

Accordingly, one object of this invention is to provide a novel process and apparatus which is designed to be able to remove solid and liquid phase inclusions as small as 40 microns in size from flowing molten metal prior to reaching a filter.

It is another object of the invention to provide a system which decreases the incidence of filter clogging and provides longer filter life and more effective filter action by enabling the use of filters which can remove finer (less than 40 microns) particles.

It is an object of the present invention to utilize a method and an apparatus which combines electromagnetic separation with filtration through the use of baffles located within the chamber where the molten metal is flowing under the influence of an applied electromagnetic field.

It is a further object of the present invention to provide a baffling system which eliminates turbulence in the flowing streams.

It is a further object of the present invention to provide a baffling system inside of a chamber where metal is flowing which minimizes the vorticity effects of the magnetic field in each of the baffled compartments which are formed.

It is a further object of the present invention to provide a baffling system which is constructed so as to attract and trap non-metallic inclusions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
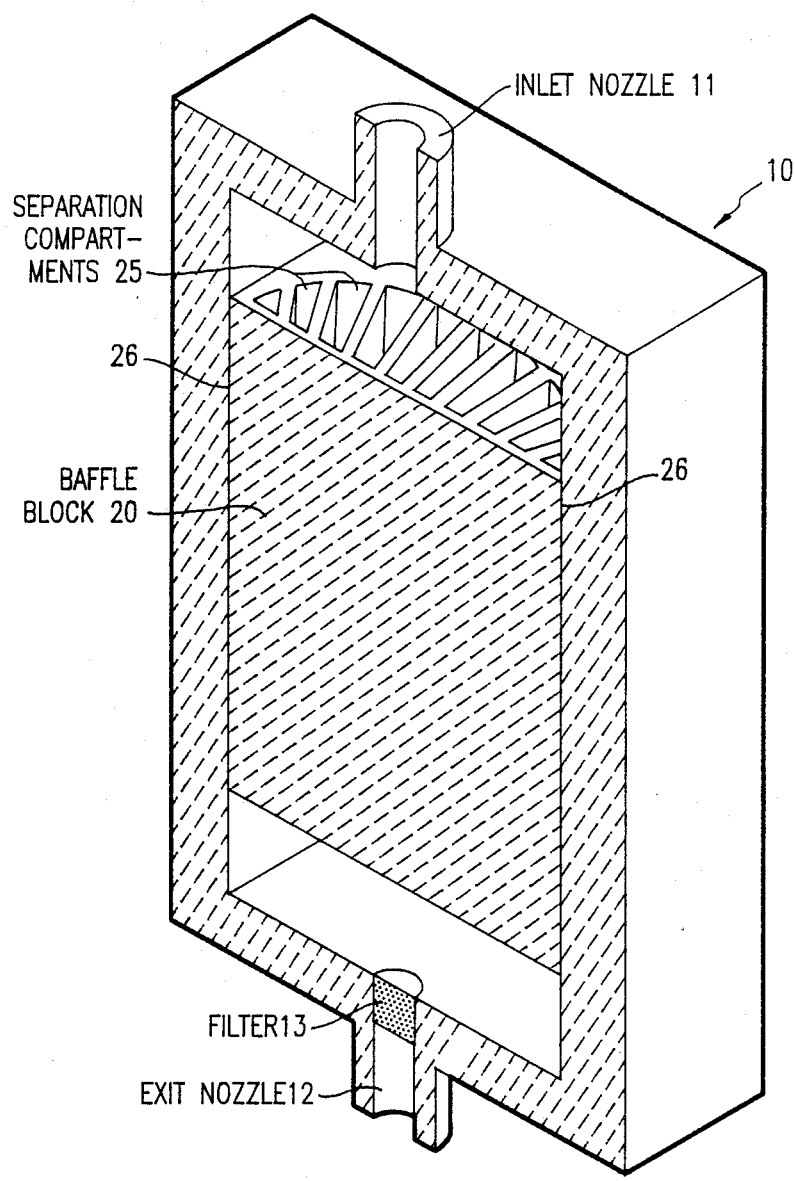
FIG. 1 is a cutaway schematic sketch of the electromagnetic separator of the present invention.

Referring now to the drawings, wherein like reference numerals designated identical or corresponding parts throughout the several views, and more particularly to FIG. 1 thereof, there is shown the electromagnetic separator system 10 of the present invention. The cutaway drawing has an inlet nozzle 11 through which the liquid metal flows and an exit nozzle 12 and a filter 13 through which the liquid metal exits. The separator 10 consists of baffle block 20 divided into separation compartments 25 which provide the passages for the liquid metal flow as shown in the paths 30 of FIG. 2.

Figure 3:
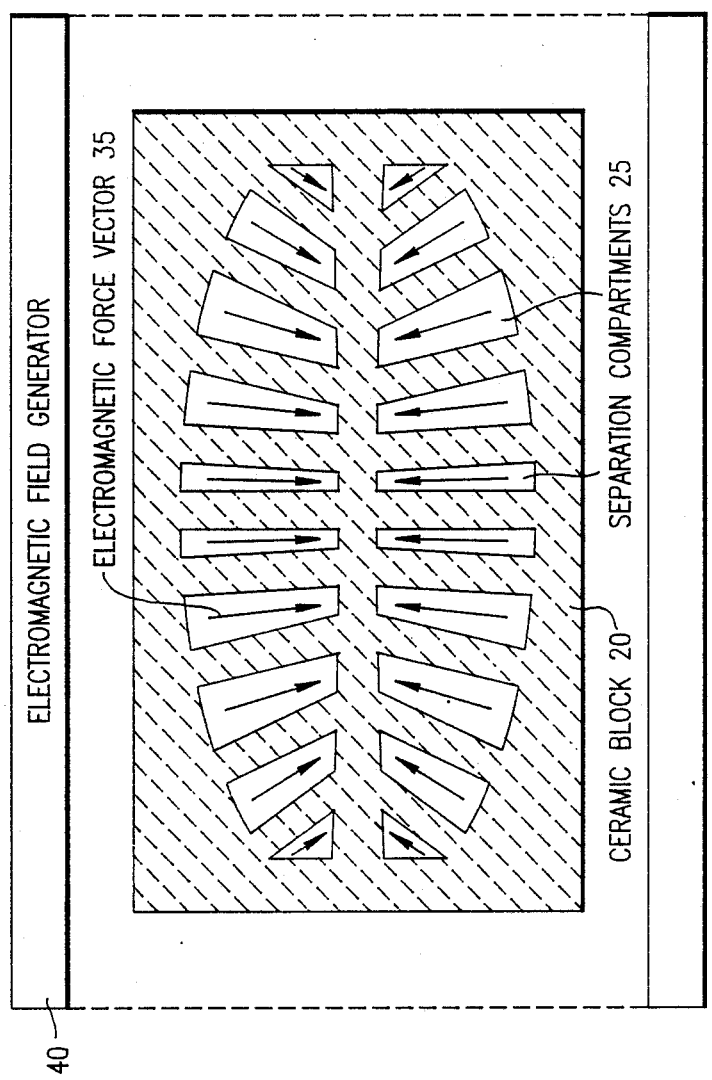
FIG. 3 is a cross-section of the ceramic baffle block of the separator of FIGS. 1 and 2.

A cross section of the baffle block 20 is shown in FIG. 3 which indicates the geometry of the baffles and which shows the placement of the separator 10 within an electromagnetic field generator 40. The baffles 25 are particularly arranged to ensure that these baffles interact with the electromagnetic force vectors 35 so that the fluid flow within each baffled compartment is eliminated in order that inclusions are forced either to the chamber walls or to one of the baffle walls 26 or to one of the baffle walls as a result of the electromagnetic field. The geometry of the baffles within the block 20 and formed by the separation compartments 25 is such that the walls of each one of the separation compartments 25 are either parallel or perpendicular to the electromagnetic force vector lines 35 as illustrated in FIG. 3. Although the geometry of the chamber and the baffles can vary, these baffles must be shaped and placed so that the baffle walls are parallel or perpendicular to the lines of the electromagnetic force. In other words, the electromagnetic field generator may be such that a different form of force vectors are utilized or realized within the ceramic block 20, however, whatever the direction of the force vectors, the baffles (separation compartments) 25 must be shaped and placed so that the walls are parallel or perpendicular to the lines of the electromagnetic force.

The arrangement of the separation compartments and their shaping in the manner illustrated in FIG. 3 with respect to parallel and perpendicular walls provides for the elimination or substantial reduction of the divergence of the electromagnetic force field within any one of the baffled compartments. As a result, no flow eddy currents or circulating fields exist within these compartments.

The baffle and chamber walls are constructed from or lined with a material which is non-conducting or substantially non-conducting, such as ceramic materials. It must be noted however, that the efficiency of the invention with respect to removing inclusions is enhanced if this non-conducting ceramic material is wet by and/or causes inclusions to adhere to it. The surface area which is available to collect inclusions may be increased if the baffles and the chamber walls are constructed of a porous material.

The separation chamber 20 of the present invention, in conjunction with its field generator 40 is placed in the outflow of an alloy melting and/or refining furnace or in any liquid metal or alloy transport system. The electromagnetic field is established and the liquid metal or alloy is allowed to flow through the chamber, in such a direction that it passes through the baffle compartments 25 and exits through the filters 13 and the nozzle 12.

This invention is particularly useful in melting and refining non-ferrous alloys in general and aluminum and its alloys in particular. This is true because filters are extensively used presently to clean these type of materials. Additionally, applications exist in the melting and refining of ferrous alloys and in particular steel and its various alloys. However, the general applicability of this device is such that it is useful for separating non-metallic inclusions and/or weakly conducting phases, inclusions or particles from any conducting liquid.

Figure 2:
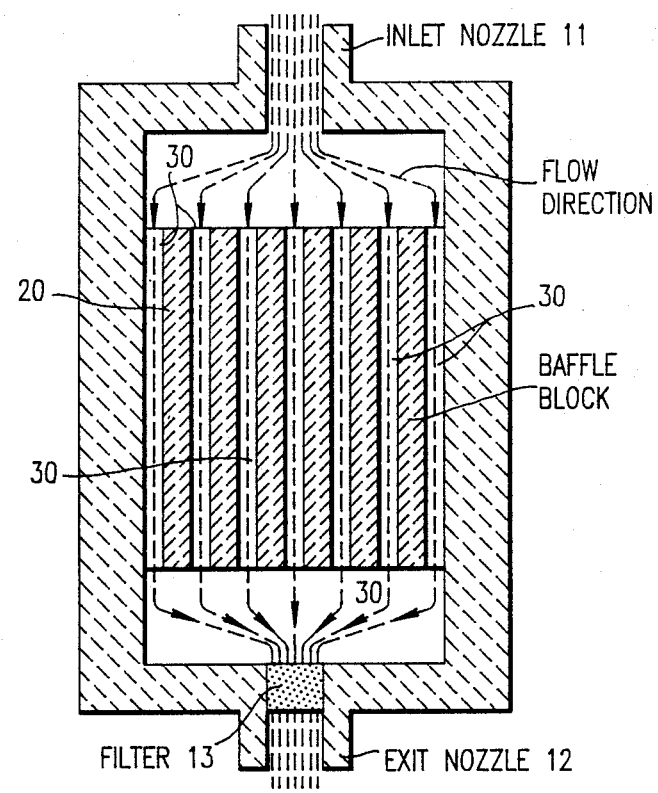
FIG. 2 illustrates a longitudinal section of the electromagnetic separator of FIG. 1.

The best operation of the system of the FIGS. 1-3 is provided by a construction of a baffling system and the use of a magnetic field so that all inclusions over 40 microns are removed within the chamber 20. The exit or discharge orifice from the chamber is fitted with the filter 13 which traps and removes inclusions which are less than 40 microns.

Thus, the combination of the filter 13 and the baffling or separation compartments 25 and their particular orientation in combination with the electromagnetic field generator 40 provides an ability to remove finer particles than can be currently removed because the larger particles are trapped in the baffle compartments and do not therefore come into contact with the filter. This leaves the finer filters to be used for their intended purpose and no clogging with coarse particles will occur. This provides an extension of filter life because the trapped coarse particles are in the baffling compartments instead of the filter.

The design and placement of the baffles, i.e. the walls of the baffles being parallel or perpendicular to the electromagnetic force vectors 35, within the chamber on which the electromagnetic field acts, substantially eliminates convective flow resulting from electromagnetic force fields acting in the plane perpendicular to the direction of metal flow. Therefore, the electromagnetic field is free to force the inclusion particles toward the chamber walls or the baffle walls where they are trapped and held by surface tension between the walls and the inclusion.

The use of porous materials on the baffle walls and the chamber walls increases the surface area available for trapping inclusions and the non-random arrangement of baffles in the chamber, so that their position is determined by the pattern of the magnetic field, provides an aid in directing the inclusion to the walls of the chamber or baffle.

Lastly, the use of a baffle compartment design in conjunction with the fine filters placed in the discharge orifice of the system, or in conjunction with fine filters placed downstream of the chamber permits the removal of the finer particles than would be available from the filters alone or would be available from the baffle compartment system alone.

Obviously, numerous and additional modifications and variations of the present invention are possible in light of the above teachings. It is therefore to be understood that within the scope of the appended claims, the invention may be practiced otherwise then as specifically described herein.

What is claimed as new and desired to be secured by Letters Patent of the U.S. is:

1. A separator systems for removing inclusions in flowing molten metal, said system comprising:
    an inlet nozzle means for receiving said molten metal;
    a substantially non-conducting baffle block for receiving said molten metal from said inlet nozzle means and having walls and a plurality of passages provided by a corresponding plurality of separator compartments with each separator compartment having walls;
    a molten metal filtration means receiving said molten metal flowing out from all of said plurality of passages of said baffle block and for filtering out any remaining inclusions;
    an outlet nozzle means receiving and outputting said molten metal without inclusions;
    an electromagnetic field producing means outside said baffle block for providing a series of electromagnetic force vectors inside said baffle block wherein the placement and the shape of each of said separator compartments depends on the direction and location of the pattern of said force vectors inside said baffle block in order to direct inclusions in said material towards said walls of said baffle block and towards said walls of said separator compartments.

2. The system according to claim 1, wherein each wall of each of said separator compartments is one of parallel and perpendicular to one of said electromagnetic force vectors generated within each compartment in order to cause said inclusions to be forced to said walls of said each compartment without causing convective flow and minimizing vorticity effects of said magnetic field in each of said compartments.

3. The system according to claim 1, wherein said walls of said separation compartments and said baffle block are porous.

4. The system according to claim 1, wherein said electromagnetic field and said separation compartment placement is such that all inclusions greater than 40 microns are removed from said molten metal and attached to said walls of said compartments and said baffle block and wherein said filtration means removes inclusions of less than 40 microns in order to produce from said outlet nozzle means an inclusion-free molten metal.

5. The system according to claim 1, wherein said molten metal is a non-ferrous alloy.

6. The system according to claim 5, wherein said non-ferrous alloy is aluminum or its alloy.

7. The system according to claim 1, wherein said molten metal is steel or its alloy.

8. The system according to claim 1, wherein said electromagnetic field generator is an alternating electromagnet.

9. The system according to claim 1, wherein said walls of said baffle block and said compartments are made of a material which adheres to said inclusions and wherein said inclusions are non-metallic particles.

10. A method of removing inclusions in flowing molten metal comprising the steps of:
    flowing said molten metal into a baffle block having a plurality of passage ways provided by a plurality of separation compartments wherein said separation compartments and said baffle block have walls;
    providing an electromagnetic field such that a series of electromagnetic force vectors are created inside said baffle block with the placement and the shape of each of said separation compartments depending on the direction and the location of each of said force vectors in order to direct inclusions in said flowing metal towards the walls of said baffle block and toward the walls of said separation compartments;
    filtering out any inclusions remaining from said step of flowing said molten metal through said baffle block; and
    outputting a inclusion-free molten metal.

11. The method according to claim 10 including the step of providing each wall of each of said separation compartments in such a way that it is one of parallel and perpendicular to the electromagnetic force vector generated within said each compartment in order to cause said inclusions to be forced to said walls of said each compartment.

12. The method according to claim 10 including said walls of said separation compartments and said baffle blocks from porous material.

13. The method according to claim 1 wherein the step of providing the electromagnetic field and the step of placing and shaping each of said separator compartments is such that all inclusions greater than 40 microns are removed from molten metal flowing through said passages and attached to said walls of said compartment and said baffle block and wherein the step of providing said filtration removes inclusions of less than 40 microns.

14. The method according to claim 10 wherein molten metal is a non-ferrous alloy.

15. The step according to claim 14, wherein said non-ferrous alloy is aluminum or its alloys.

16. The method according to claim 10, wherein said molten metal is steel or its alloys.

17. The method according to claim 10, wherein the step of providing said electromagnetic field includes the use of an alternating electromagnet.

* * * * *